(12) United States Patent
Zhang et al.

(10) Patent No.: US 11,644,722 B2
(45) Date of Patent: May 9, 2023

(54) DISPLAY SUBSTRATE AND MANUFACTURING METHOD THEREOF, AND DISPLAY PANEL

(71) Applicants: Beijing BOE Display Technology Co., Ltd., Beijing (CN); BOE Technology Group Co., Ltd., Beijing (CN)

(72) Inventors: Xiaoxiang Zhang, Beijing (CN); Xiaolong Li, Beijing (CN); Yihe Jia, Beijing (CN); Lianjie Yang, Beijing (CN); Xiangqian Ding, Beijing (CN); Yongzhi Song, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/472,711

(22) Filed: Sep. 13, 2021

(65) Prior Publication Data
US 2022/0236600 A1 Jul. 28, 2022

(30) Foreign Application Priority Data
Jan. 28, 2021 (CN) .......................... 202110118699.1

(51) Int. Cl.
*G02F 1/1343* (2006.01)
*G02F 1/1333* (2006.01)
(52) U.S. Cl.
CPC .... *G02F 1/13439* (2013.01); *G02F 1/133354* (2021.01); *G02F 1/134309* (2013.01)

(58) Field of Classification Search
None
See application file for complete search history.

(56) References Cited

U.S. PATENT DOCUMENTS

| | | | |
|---|---|---|---|
| 2005/0217720 A1* | 10/2005 | Rey-Mermet | H01G 9/20 156/263 |
| 2014/0339574 A1* | 11/2014 | Kang | G02F 1/13452 257/88 |
| 2017/0005083 A1* | 1/2017 | Choi | H01L 27/3276 |
| 2017/0082900 A1* | 3/2017 | Kong | G02F 1/13452 |
| 2020/0301201 A1* | 9/2020 | Cho | G02F 1/136286 |
| 2021/0055594 A1* | 2/2021 | Zheng | G02F 1/13452 |
| 2021/0066201 A1* | 3/2021 | Son | G02F 1/13458 |
| 2021/0294137 A1* | 9/2021 | Pan | G02F 1/13452 |
| 2021/0349365 A1* | 11/2021 | Fu | G02F 1/136295 |
| 2021/0358965 A1* | 11/2021 | Ye | H05K 1/144 |

* cited by examiner

*Primary Examiner* — Ryan Crockett
(74) *Attorney, Agent, or Firm* — Ling Wu; Stephen Yang; Ling and Yang Intellectual Property

(57) ABSTRACT

Provided is a display substrate, a manufacturing method thereof and a display panel. The display substrate includes a base substrate, a display region and a bonding region located at a side of the display region on the base substrate, wherein the bonding region includes a first protective layer and a bonding electrode disposed on the base substrate; the first protective layer is provided with a groove; the bonding electrode is at least partially disposed in the groove; in a direction parallel to the base substrate, the groove, the bonding electrode and the first protective layer extend to an edge of the bonding region in a direction away from the display region; and a material of the first protective layer is less hard than a material of the bonding electrode.

19 Claims, 3 Drawing Sheets

US 11,644,722 B2

DISPLAY SUBSTRATE AND MANUFACTURING METHOD THEREOF, AND DISPLAY PANEL

CROSS-REFERENCE TO RELATED APPLICATION

The present application claims priority of Chinese Patent Application No. 202110118699.1 filed to the CNIPA on Jan. 28, 2021, the content of which is hereby incorporated by reference.

TECHNICAL FIELD

The present disclosure relates to the field of display technology, and in particular to a display substrate, a method for manufacturing the display substrate, and a display panel.

BACKGROUND

TFT-LCD liquid crystal displays mostly adopt a method of Outer Lead Bonding (OLB), in which an upper substrate and a lower substrate are staggered by a certain distance by a non-flush-cut design, and exposed leads are linked to a drive Integrated Circuit (IC) to input drive signals into a panel. A method for linking to the drive integrated circuit is to first bind an end of a Chip OnFilm (COF) to a bonding lead of a TFT substrate, and fix the other end of the COF to a Printed Circuit Board (PCB). Anisotropic Conductive Films (ACF) are usually used as an adhesive between components to achieve fixation and conduction.

With the development of the market, bezels of display screens are gradually narrowing, and exposed leads in an outer lead bonding region become obstacles to the narrow bezel. On the other hand, the bonding process of COF requires a certain width for OLB, thus increasing a bezel width of the whole machine.

Regarding the above-mentioned defects of the outer lead bonding design, a new Side Bonding technology has emerged in the industry, which cuts the upper and lower substrates to make them flush with each other and exposes cross sections of metal leads through side grinding. Printed conductive films are used for side-bonding the cross sections of the metal leads, thus achieving the bonding of drive integrated circuit boards. However, when the metal leads are exposed through side grinding, the metal leads are prone to damages, which affects the bonding effect.

SUMMARY

The following is a summary of subject matters described in detail in the present disclosure. This summary is not intended to limit the scope of protection of the claims.

In a first aspect, an embodiment of the present disclosure provides a display substrate, including a base substrate a display region and a bonding region located at a side of the display region on the base substrate, wherein the bonding region includes a first protective layer and a bonding electrode which are disposed on the base substrate; the first protective layer is provided with a groove; at least part of the bonding electrode is disposed in the groove; in a direction parallel to the base substrate, the groove, the bonding electrode and the first protective layer extend to an edge of the bonding region in a direction away from the display region.

In an exemplary embodiment, a hardness of a material of the first protective layer is smaller than a hardness of a material of the bonding electrode.

In an exemplary embodiment, the first protective layer may be made of an organic material.

In an exemplary embodiment, a thickness of the first protective layer is 20-50 nm in a direction perpendicular to the base substrate.

In an exemplary embodiment, in a direction perpendicular to the base substrate, the bonding electrode includes a first sub-electrode and a second sub-electrode which are stacked.

In an exemplary embodiment, the display region includes a gate electrode disposed on the base substrate, and the first sub-electrode and the gate electrode are formed in a same film layer.

In an exemplary embodiment, the display region further includes a gate insulating layer disposed on a side of the gate electrode layer away from the base substrate and a source-drain layer disposed on a side of the gate insulating layer away from the base substrate, wherein the second sub-electrode and the source-drain layer are formed in a same film layer.

In an exemplary embodiment, the first sub-electrode and the second sub-electrode are made of a same material.

In an exemplary embodiment, a side of the groove close to the base substrate is provided with an opening; or a side of the groove away from the base substrate is provide with an opening; or, the groove penetrates through the first protective layer, and the side of the groove close to the base substrate and the side of the groove away from the base substrate are each provided with an opening.

In an exemplary embodiment, a vertical projection of the first protective layer on the base substrate does not overlap with a vertical projection of the display region on the base substrate.

In an exemplary embodiment, the bonding region further includes a second protective layer, and the second protective layer is disposed on a side of the bonding electrode away from the base substrate.

In an exemplary embodiment, a hardness of a material of the second protective layer is smaller than a hardness of a material of the bonding electrode.

In an exemplary embodiment, the second protective layer is made of a conductive material and is connected to the bonding electrodes, and at least two bonding electrodes are disposed on the base substrate, and the second protective layers are disposed in one-to-one correspondence with the bonding electrodes, and adjacent second protective layers are disconnected from each other.

In an exemplary embodiment, the second protective layer is made of a conductive material; an insulating layer is disposed between the second protective layer and the bonding electrodes; at least two bonding electrodes are disposed on the base substrate; and the second protective layer is a continuous film layer covering the bonding electrodes.

In an exemplary embodiment, the second protective layer is made of an insulating material, at least two bonding electrodes are disposed on the base substrate, and the second protective layer is a continuous film layer covering the bonding electrodes.

In a second aspect, an embodiment of the present disclosure provides a display panel, including any of aforementioned display substrates and a color filter substrate which are aligned with each other.

In a third aspect, an embodiment of the present disclosure provides a method for manufacturing a display substrate, including:

forming a display region and a bonding region located at a side of the display region on a base substrate, wherein the bonding region includes a first protective layer and a bonding electrode disposed on the base substrate; the first protective layer is provided with a groove; at least part of the bonding electrode is disposed in the groove; in a direction parallel to the base substrate, the groove, the bonding electrode and the first protective layer extend to an edge of the bonding region in a direction away from the display region; and a material of the first protective layer is less hard than a material of the bonding electrode.

Of course, an implementation of any product or method in the embodiments of the present disclosure does not need to achieve all the advantages mentioned above at the same time. Other features and advantages of the present disclosure will be set forth in the following embodiments of the description, and in part will become apparent from the embodiments of the description, or be learned by practice of the present disclosure. Purposes and other advantages of the technical solutions of the present disclosure may be achieved and acquired by structures specified in the detailed description, claims and drawings.

Other aspects may be understood upon reading and understanding of the drawings and the detailed description.

BRIEF DESCRIPTION OF DRAWINGS

The drawings are used to provide a further understanding of technical solutions of the present disclosure and constitute a part of the description, which are used to explain the technical solutions of the present disclosure together with the embodiments of the present disclosure and do not constitute limitations to the technical solutions of the present disclosure. The shape and size of each component in the drawings do not reflect true scales and are only used to schematically illustrate the contents of the present disclosure.

DETAILED DESCRIPTION

Specific implementations of the present disclosure will be described further in detail below with reference to the accompanying drawings and embodiments. The following embodiments serve to illustrate the present disclosure, but are not intended to limit the scope of the present disclosure.

The embodiments in the present disclosure and the features in the embodiments may be randomly combined with each other if there is no conflict.

Taking a liquid crystal display device as an example, the display device adopts a side bonding method, which is as follows: after an array substrate and a color filter substrate are aligned to form a liquid crystal cell, flush cutting is carried out along a bonding region of the liquid crystal cell, then a cross section formed after the cutting of bonding region is ground to expose a cross section of a bonding electrode, and the cross section of the bonding electrode is side bonded with a drive integrated circuit board by a printed conductive film.

Figure 1:
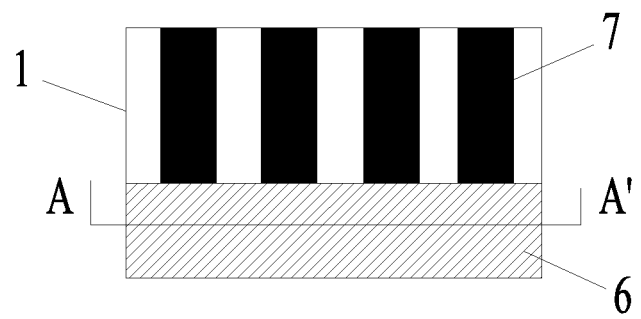
FIG. 1 is a schematic diagram of a structure of a bonding region in a display substrate.
Figure 2:
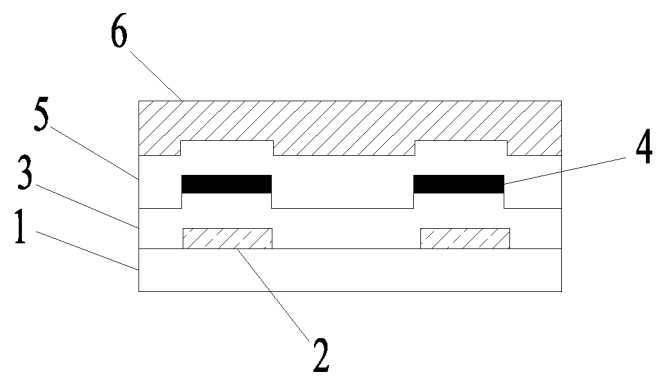
FIG. 2 is a cross-sectional view taken along an A-A' direction in FIG. 1.

FIG. 1 is a schematic diagram of a structure of a bonding region in a display substrate. FIG. 2 is a cross-sectional view taken along an A-A' direction in FIG. 1. As shown in FIG. 1 and FIG. 2, the bonding region of the display substrate includes a first sub-electrode 2, a first insulating layer 3, a second sub-electrode 4, a second insulating layer 5 and a first protective layer 6 which are sequentially stacked on a base substrate 1. The second sub-electrode 4 is connected to a signal lead in the display region of the display substrate. The first sub-electrode 2 is connected to the second sub-electrode 4, and the first sub-electrode 2 and the second sub-electrode 4 are combined to form a bonding electrode 7. The first sub-electrode 2 in the bonding region and a gate electrode in the display region are made of a same material through a same manufacturing process. The first insulating layer 3 in the bonding region and a gate insulating layer in the display region are made of a same material through a same manufacturing process. The second sub-electrode 4 in the bonding region and a source-drain layer in the display region are made of a same material through a same manufacturing process. The second insulating layer 5 in the bonding region and a passivation layer in the display region are made of a same material through a same manufacturing process. The first protective layer 6 in the bonding region is made of an organic material, wherein the first protective layer 6 is used to protect the bonding electrode during cutting and grinding, so as to avoid damage to the bonding electrode.

The first insulating layer 3 and the second insulating layer 5 in the bonding region are made of the same material as the gate insulating layer and passivation layer in the display region, and they are both made of an inorganic material, which makes hardness of the material of the first insulating layer 3 and the second insulating layer 5 greater than hardness of the material of the first sub-electrode 2 and the second sub-electrode 4. In a process of cutting and grinding the bonding electrode 7, debris produced by the first insulating layer 3 and the second insulating layer 5 will damage the first sub-electrode 2 and the second sub-electrode 4, leading to that a display signal of the bonded drive integrated circuit cannot be smoothly introduced into the display substrate via the bonding electrode 7, which further results in an abnormal picture.

Figure 3:
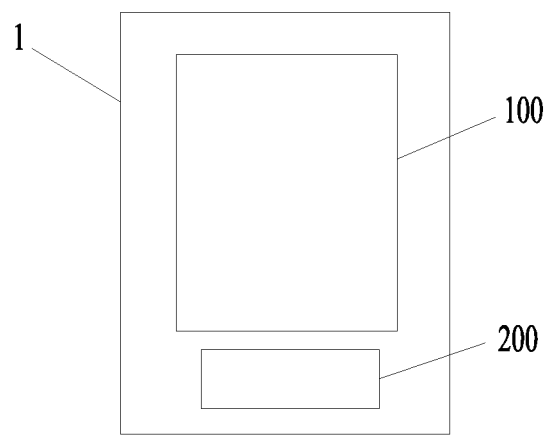
FIG. 3 is a schematic diagram of a structure of a display substrate according to an embodiment of the present disclosure.

FIG. 3 is a schematic diagram of a structure of a display substrate according to an embodiment of the present disclosure. As shown in FIG. 3, the display substrate of the embodiment of the present disclosure includes a base substrate 1, a display region 100 disposed on the base substrate 1 and a bonding region 200 located at a side of the display region 100.

In an exemplary embodiment, the base substrate 1 may have a rectangular shape. In some embodiments, the base substrate 1 may include a pair of short sides parallel to each other in a first direction and a pair of long sides parallel to each other in a second direction. Among them, the first direction is a length direction of the base substrate 1, and the second direction is a width direction of the base substrate 1.

In some exemplary embodiments, shapes of the base substrate 1 are not limited thereto, and the base substrate 1 may have various shapes. For example, the base substrate 1 may be configured to have various shapes, such as a closed polygon including a linear side, a circle and an ellipse including curved sides, and a semicircle and a semi-ellipse including a linear side and a curved side.

In some exemplary embodiments, when the base substrate 1 has a linear side, at least some corners of each shape may be formed as curves. For example, when the base substrate 1 has a rectangular shape, a portion where adjacent linear sides meet each other may be replaced with a curve having a predetermined curvature. The curvature may be set differently according to the position of the curve. For example, the curvature may be changed according to a position where the curve starts, a length of the curve, etc.

Figure 4:
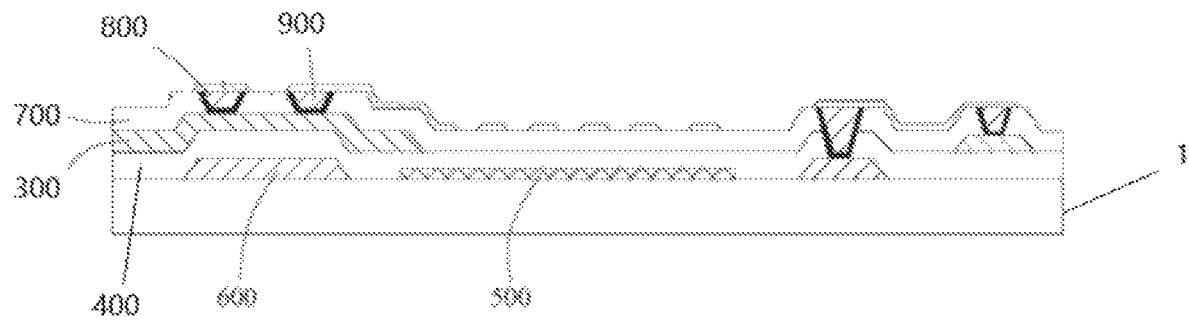
FIG. 4 is a cross-sectional view of a display region in a display substrate according to an embodiment of the present disclosure.

FIG. 4 is a cross-sectional view of a display region in a display substrate according to an exemplary embodiment of the present disclosure. In a horizontal direction of the base substrate, the display region of the display substrate includes multiple pixel units, wherein each pixel unit is provided therein with a thin film transistor. As shown in FIG. 4, in a thickness direction of the base substrate 1, each of the thin film transistors includes a gate electrode 600 and a common electrode 500 which are disposed on the base substrate 1, a gate insulating layer 400 covering the gate electrode 600 and the common electrode 500, an active layer 300 disposed on the gate insulating layer 400, and a passivation layer 700 and a source-drain layer disposed on the active layer 300. The source-drain layer includes a source electrode 800 and a drain electrode 900. A source via hole penetrating through the passivation layer 700 and a drain via hole penetrating through the passivation layer 700 are formed on the passivation layer 700. The source electrode 800 is disposed in the source via hole to be connected to the active layer 300, and the drain electrode 900 is disposed in the drain via hole to be connected to the active layer 300.

In an exemplary embodiment, the source electrode and the drain electrode may be made of metal. For example, the source electrode and the drain electrode may be made of at least one of metals such as gold (Au), silver (Ag), aluminum (Al), molybdenum (Mo), chromium (Cr), titanium (Ti), nickel (Ni), neodymium (Nd) and copper (Cu) or any alloy of these metals.

In an exemplary embodiment, the passivation layer may be an inorganic insulating layer made of an inorganic material. The inorganic material may include polysiloxane, silicon nitride, silicon oxide, silicon oxynitride, etc.

In an exemplary embodiment, the gate insulating layer may be an inorganic insulating layer made of an inorganic material. Inorganic materials may include polysiloxane, silicon nitride, silicon oxide, silicon oxynitride, etc.

In an exemplary embodiment, the active layer may be made of an oxide. In an exemplary embodiment, the active layer may be made of Indium Gallium Zinc Oxide (IGZO).

In an exemplary embodiment, a bonding region in a display substrate of the exemplary embodiment of the present disclosure is a region where no pixel is provided, and no image is displayed in the bonding region. A signal lead connected to a pixel unit may extend in the bonding region and be connected to the bonding electrode in the bonding region.

In an exemplary embodiment, the signal lead may include a scan line, a data line, a power supply voltage line, etc., and provide signals so that pixels display images in response to the signals.

Figure 5:
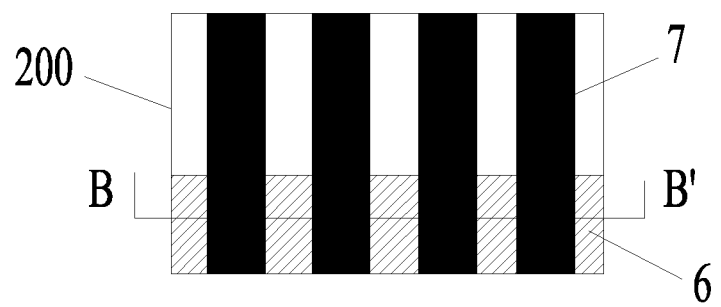
FIG. 5 is a schematic diagram of a structure of a bonding region in a display substrate according to an embodiment of the present disclosure.
Figure 6:
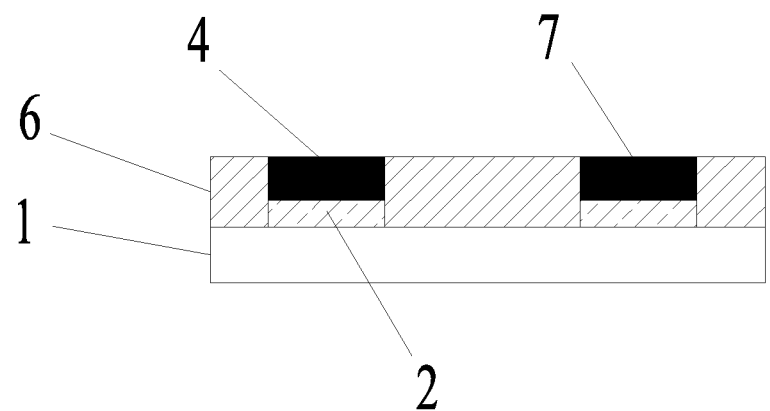
FIG. 6 is a cross-sectional view taken along a B-B' direction in FIG. 5.

FIG. 5 is a schematic diagram of a structure of a bonding region in a display substrate according to an embodiment of the present disclosure. FIG. 6 is a cross-sectional view taken along a B-B' direction in FIG. 5. As shown in FIG. 5 and FIG. 6, the bonding region 200 in the display substrate of the exemplary embodiment of the present disclosure includes a first protective layer 6 and a bonding electrode 7 which are disposed on the base substrate 1, wherein the first protective layer 6 is provided with a groove, and at least part of the bonding electrode 7 is disposed in the groove. In a direction parallel to the base substrate 1, the groove, the bonding electrode 7 and the first protective layer 6 extend to an edge of the bonding region 200 in a direction away from the display region, so that the first protective layer 6 can protect the bonding electrode 7. A hardness of the material of the first protective layer 6 is smaller than a hardness of the material of the bonding electrode 7. When cutting and grinding the bonding electrode 7, the first protective layer 6 can protect the bonding electrode 7 and avoid debris produced by the first protective layer 6 from damaging the bonding electrode 7. Furthermore, the first protective layer 6 has a lubrication effect, and protects the bonding electrode 7 during cutting and grinding of the bonding electrode 7.

In an exemplary embodiment, the bonding electrode 7 may be completely filled in the groove, so that the first protective layer 6 can fully wrap opposite sides of the bonding electrode 7 in the horizontal direction of the base substrate 1, and protect the bonding electrode 7 from damages. In an exemplary embodiment, a side of the bonding electrode away from the base substrate is flush with a side of the first protective layer away from the base substrate; or, the side of the bonding electrode away from the base substrate is lower than the side of the first protective layer away from the base substrate.

In some exemplary embodiments, the bonding electrode may be partially exposed from the groove, that is, the side of the bonding electrode away from the base substrate is higher than the side of the first protective layer away from the base substrate.

In an exemplary embodiment, at least two bonding electrodes 7 are disposed in parallel on the base substrate 1 at intervals, and adjacent bonding electrodes 7 are separated by the first protective layer 6, so as to avoid mutual interference of signals of adjacent bonding electrodes 7.

In an exemplary embodiment, a vertical projection of the first protective layer 6 on the base substrate 1 does not overlap with a vertical projection of the display region on the base substrate 1, that is, the first protective layer 6 is only disposed in the bonding region 200, which prevents the first protective layer 6 from increasing a thickness of the display region, and no additional manufacturing process is added during the manufacture of the display region.

In an exemplary embodiment, the first protective layer 6 may be made of an organic material. Organic materials may include organic insulating materials of polyacrylic compounds, polyimide compounds, fluorine compounds (such as Teflon) or benzocyclobutene compounds.

In an exemplary embodiment, a thickness of the first protective layer 6 is 20-50 nm in a direction perpendicular to the base substrate 1, so that the first protective layer 6 can effectively protect the bonding electrode 7 from damages. When the thickness of the first protective layer 6 is less than 20 nm, the first protective layer 6 is too thin, which makes the bonding electrode 7 prone to damages during cutting and grinding. When the thickness of the first protective layer 6 is greater than 50 nm, the first protective layer 6 is too thick, which increases a thickness of the bonding region.

In an exemplary embodiment, various structures may be used for the groove of the first protective layer. For example, a side of the groove of the first protective layer close to the base substrate is provided with an opening. Or, a side of the groove of the first protective layer away from the base substrate is provided with an opening. Or, the groove penetrates through the first protective layer, and the side of the groove close to the base substrate and the side of the groove away from the base substrate are each provided with an opening, as shown in FIG. 6.

In an exemplary embodiment, the bonding electrode 7 includes a first sub-electrode 2 and a second sub-electrode 4 disposed in a stacked manner in the direction perpendicular to the base substrate 1. The first sub-electrode 2 is located at a side of the bonding electrode 7 close to the base substrate 1, and the second sub-electrode 4 is located at a side of the bonding electrode 7 away from the base substrate 1. The first sub-electrode 2 and the second sub-electrode 4 are combined to form the bonding electrode 7, which can increase a thickness of the bonding electrode 7, thereby increasing a side bonding area of the bonding electrode 7.

In an exemplary embodiment, the first sub-electrode and the second sub-electrode may be made of metal. For example, the first and second sub-electrodes may be made of at least one of metals such as gold (Au), silver (Ag), aluminum (Al), molybdenum (Mo), chromium (Cr), titanium (Ti), nickel (Ni), neodymium (Nd) and copper (Cu) or any alloy of these metals.

In an exemplary embodiment, the first sub-electrode and the second sub-electrode are made of the same material to avoid damage to the first sub-electrode during etching of the second sub-electrode, and an electrochemical corrosion problem caused by different materials of the first sub-electrode and the second sub-electrode is avoided.

In an exemplary embodiment, the first sub-electrode and the gate electrode in the display region are formed in a same film layer. The first sub-electrode is disconnected from the gate electrode in the display region. The first sub-electrode and the gate electrode in the display region being formed in the same film layer means that the first sub-electrode and the gate electrode in the display region are made of a same material through a same manufacturing process. During manufacturing of the gate electrode, a pattern of the first sub-electrode may be formed from a metal layer of the gate electrode, thus simplifying a manufacturing process of the first sub-electrode, and manufacturing costs are reduced and the production capability is improved.

In an exemplary embodiment, the second sub-electrode and the source-drain layer in the display region are formed in a same film layer, and the second sub-electrode is disconnected from the source electrode and the drain electrode of the source-drain layer in the display region. Herein, the second sub-electrode and the source-drain layer in the display region being formed in the same film layer means that the second sub-electrode and the source-drain layer in the display region are made of a same material through a same manufacturing process. During manufacturing of the source-drain layer, a pattern of the second sub-electrode may be formed from a metal layer of the source-drain layer, thus simplifying a manufacturing process of the second sub-electrode, and manufacturing costs are reduced and the production capability is improved.

Figure 7:
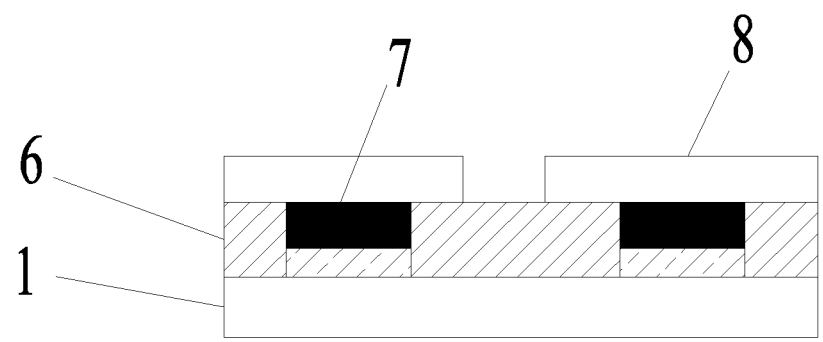
FIG. 7 is a cross-sectional view of a bonding region in a display substrate according to an embodiment of the disclosure.

FIG. 7 is a cross-sectional view of a bonding region in a display substrate according to an exemplary embodiment of the present disclosure. As shown in FIG. 7, in the thickness direction of the base substrate 1, the bonding region further includes a second protective layer 8, wherein the second protective layer 8 is disposed on the side of the bonding electrode 7 away from the base substrate 1, and the second protective layer 8 is used for protecting the bonding electrode 7 and preventing the bonding electrode 7 from being corroded.

In an exemplary embodiment, a hardness of the material of the second protective layer 8 is smaller than a hardness of the material of the bonding electrode 7, so as to avoid debris produced by the second protective layer 8 from damaging the bonding electrode 7 during cutting and grinding of the bonding electrode 7.

In an exemplary embodiment, the second protective layer 8 may be made of a conductive material, for example, the second protective layer 8 may be made of an ITO (Indium Tin Oxide) material. The second protective layer 8 is connected to the bonding electrode 7, so that a cross-sectional area of the bonding electrode 7 can be increased. When at least two bonding electrodes 7 are disposed on the base substrate 1, the second protective layers 8 are disposed in one-to-one correspondence with the bonding electrodes 7, and the adjacent second protective layers 8 are disconnected from each other to prevent signals between the adjacent bonding electrodes 7 from interfering with each other.

In some embodiments, the second protective layer may be made of a conductive material, for example, an ITO material. An insulating layer is disposed between the second protective layer and the bonding electrode, and the insulating layer is used for separating the second protective layer from the bonding electrode. When at least two bonding electrodes are disposed on the base substrate, the second protective layer is a continuous film layer covering the bonding electrodes, thereby preventing the bonding electrodes from being corroded.

In some embodiments, the second protective layer may be made of an insulating material. When at least two bonding electrodes are disposed on the base substrate, the second protective layer is a continuous film layer covering the bonding electrodes, thereby preventing the bonding electrodes from being corroded.

Figure 8:
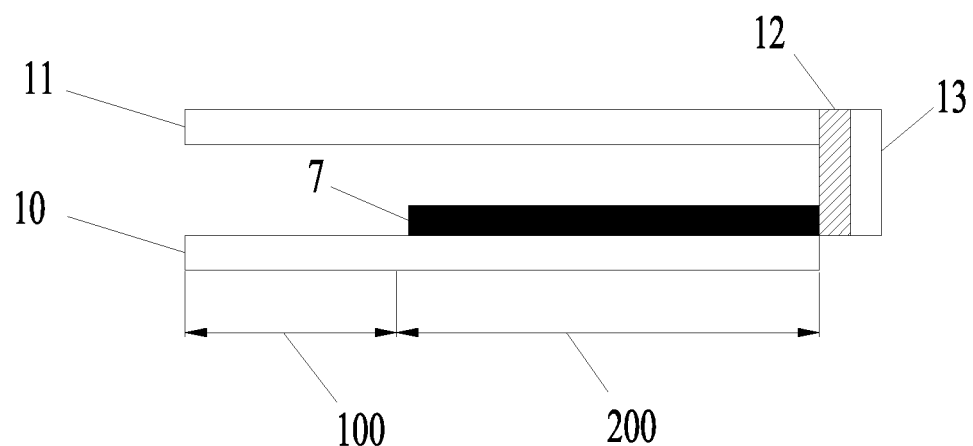
FIG. 8 is a cross-sectional view of a display panel after side bonding according to an embodiment of the disclosure.

FIG. 8 is a cross-sectional view of a display panel after side bonding according to an exemplary embodiment of the present disclosure. As shown in FIG. 8, an exemplary embodiment of the present disclosure further provides a display panel, which includes the display substrate 10 of the aforementioned exemplary embodiment and a counter substrate 11, and the display substrate 10 and the counter substrate 11 are disposed to be aligned with each other.

Taking the display substrate 10 being an array substrate and the counter substrate 11 being a color filter substrate as an example, a process of side bonding of the display panel according to an exemplary embodiment of the present disclosure will be described.

The display substrate 10 includes a display region 100 and a bonding region 200 disposed on a side of the display region 100. According to the exemplary embodiment of the present disclosure, the process of side bonding of the display panel includes:

Step 1: disposing a display substrate 10 and a counter substrate 11 opposite to each other to form a panel to be cut, and cutting the panel to be cut along an edge of a bonding region of the display substrate 10;

Step 2: grinding a side surface of the bonding electrode of the display substrate 10 in the panel to be cut to expose a cross section of the bonding electrode. In an exemplary embodiment, the cross section of the bonding electrode may be exposed by cutting, edging, etc.

Step 3: coating a printed conductive film 12 on the cross section of the bonding electrode and bonding it with a COF 13. Herein, an end of the COF 13 is connected to the printed conductive film 12, and the other end of the COF is configured to be connected to a drive integrated circuit.

An exemplary embodiment of the present disclosure provides a method for manufacturing a display substrate, including:

forming a display region and a bonding region located at a side of the display region on a base substrate, wherein the bonding region includes a first protective layer and a bonding electrode which are disposed on the base substrate; the first protective layer is provided with a groove; the bonding electrode is at least partially disposed in the groove; in a direction parallel to the base substrate, the groove, the bonding electrode and the first protective layer extend to an edge of the bonding region in a direction away from the display region; and a hardness of a material of the first protective layer is smaller than a hardness of a material of the bonding electrode.

In the description of the present disclosure, it should be understood that an orientation or positional relation indicated by the terms "middle", "upper", "lower", "front", "rear", "vertical", "horizontal", "top", "bottom", "inner", "outer" and the like is based on the orientation or positional relation shown in the accompanying drawings, which is only for the convenience of describing the present disclosure and simplifying the description, rather than indicating or implying that the apparatus or element referred to must have the specific orientation, or be constructed and operated in the specific orientation, and thus may not be interpreted as a limitation on the present disclosure.

In the description of the embodiments of the present disclosure, it should be noted that unless otherwise clearly specified and defined, the terms "install", "couple", "connect" should be broadly interpreted, for example, a connection may be a fixed connection, or a detachable connection, or an integrated connection; it may be a mechanical connection or an electrical connection; it may be a direct connection, or may be an indirect connection through an intermediary, or may be an internal connection between two elements. Those of ordinary skills in the art may understand meanings of the above terms in the present disclosure according to situations.

Although the embodiments disclosed in the present disclosure are described as above, the contents described are only embodiments adopted for the convenience of understanding the present disclosure and are not used to limit the present disclosure. Any person skilled in the art to which the present disclosure belongs may make any modification and change in the form and details of implementation without departing from the essence and scope disclosed in the present disclosure. However, the scope of protection of the present disclosure shall still be subject to the scope defined in the appended claims.

What we claim is:

1. A display substrate, comprising: a base substrate, a display region and a bonding region located at a side of the display region on the base substrate, wherein the bonding region comprises a first protective layer and a bonding electrode which are disposed on the base substrate; the first protective layer is provided with a groove; at least part of the bonding electrode is disposed in the groove; in a direction parallel to the base substrate, the groove, the bonding electrode and the first protective layer extend to an edge of the bonding region in a direction away from the display region; and a hardness of a material of the first protective layer is smaller than a hardness of a material of the bonding electrode, wherein a side of the groove close to the base substrate and a side of the groove away from the base substrate are each provided with an opening.

2. The display substrate according to claim 1, wherein the first protective layer is made of an organic material.

3. The display substrate according to claim 1, wherein in a direction perpendicular to the base substrate, a thickness of the first protective layer is 20-50 nm.

4. The display substrate according to claim 1, wherein the bonding electrode comprises a first sub-electrode and a second sub-electrode which are stacked in a direction perpendicular to the base substrate.

5. The display substrate according to claim 4, wherein the display region comprises a gate electrode disposed on the base substrate, and the first sub-electrode and the gate electrode are formed in a same film layer.

6. The display substrate according to claim 5, wherein the display region further comprises a gate insulating layer disposed on a side of the gate electrode layer away from the base substrate and a source-drain layer disposed on a side of the gate insulating layer away from the base substrate, wherein the second sub-electrode and the source-drain layer are formed in a same film layer.

7. The display substrate according to claim 4, wherein the first sub-electrode and the second sub-electrode are made of a same material.

8. The display substrate according to claim 1, wherein a vertical projection of the first protective layer on the base substrate does not overlap with a vertical projection of the display region on the base substrate.

9. The display substrate according to claim 1, wherein the bonding region further comprises a second protective layer, and the second protective layer is disposed on a side of the bonding electrode away from the base substrate.

10. The display substrate according to claim 9, wherein a hardness of a material of the second protective layer is smaller than a hardness of a material of the bonding electrode.

11. The display substrate according to claim 9, wherein the second protective layer is made of a conductive material and is connected to the bonding electrodes, and at least two bonding electrodes are disposed on the base substrate, and the second protective layers are disposed in one-to-one correspondence with the bonding electrodes, and adjacent second protective layers are disconnected from each other.

12. The display substrate according to claim 9, wherein the second protective layer is made of a conductive material; an insulating layer is disposed between the second protective layer and the bonding electrodes; at least two bonding electrodes are disposed on the base substrate; and the second protective layer is a continuous film layer covering the bonding electrodes.

13. The display substrate according to claim 9, wherein the second protective layer is made of an insulating material, at least two bonding electrodes are disposed on the base substrate, and the second protective layer is a continuous film layer covering the bonding electrodes.

14. A display panel, comprising a display substrate and a counter substrate which are aligned with each other, wherein the display substrate comprises a base substrate, a display region on the base substrate and a bonding region located at a side of the display region; the bonding region comprises a first protective layer and a bonding electrode which are disposed on the base substrate; the first protective layer is provided with a groove; at least part of the bonding electrode is disposed in the groove; in a direction parallel to the base substrate, the groove, the bonding electrode and the first protective layer extend to an edge of the bonding region in a direction away from the display region; and a hardness of a material of the first protective layer is smaller than a hardness of a material of the bonding electrode, wherein a side of the groove close to the base substrate and a side of the groove away from the base substrate are each provided with an opening.

15. The display panel according to claim 14, wherein the bonding electrode comprises a first sub-electrode and a second sub-electrode which are stacked in a direction perpendicular to the base substrate.

16. The display panel according to claim 14, wherein a side of the groove close to the base substrate is provided with an opening; or a side of the groove away from the base substrate is provide with an opening; or, the groove penetrates through the first protective layer, and the side of the groove close to the base substrate and the side of the groove away from the base substrate are each provided with an opening.

17. The display panel according to claim 14, wherein a vertical projection of the first protective layer on the base substrate does not overlap with a vertical projection of the display region on the base substrate.

18. The display panel according to claim 14, wherein the bonding region further comprises a second protective layer, and the second protective layer is disposed on a side of the bonding electrode away from the base substrate.

19. A display substrate, comprising: a base substrate, a display region and a bonding region located at a side of the display region on the base substrate, wherein the bonding region comprises a first protective layer and a bonding electrode which are disposed on the base substrate; the first protective layer is provided with a groove; at least part of the bonding electrode is disposed in the groove; in a direction parallel to the base substrate, the groove, the bonding electrode and the first protective layer extend to an edge of the bonding region in a direction away from the display region; and a hardness of a material of the first protective layer is smaller than a hardness of a material of the bonding electrode, wherein the groove penetrates through the first protective layer.

* * * * *